Patented Mar. 20, 1928.

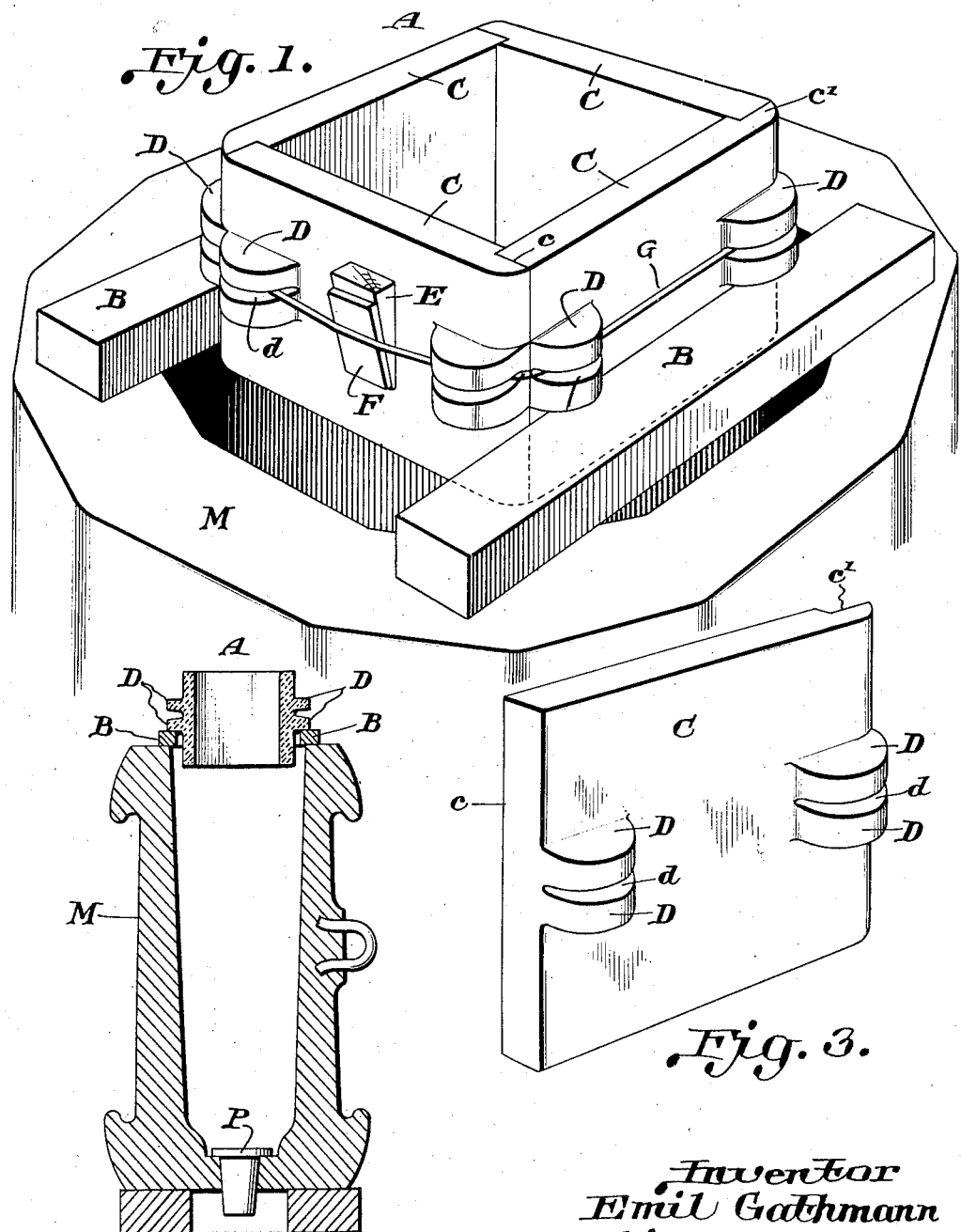

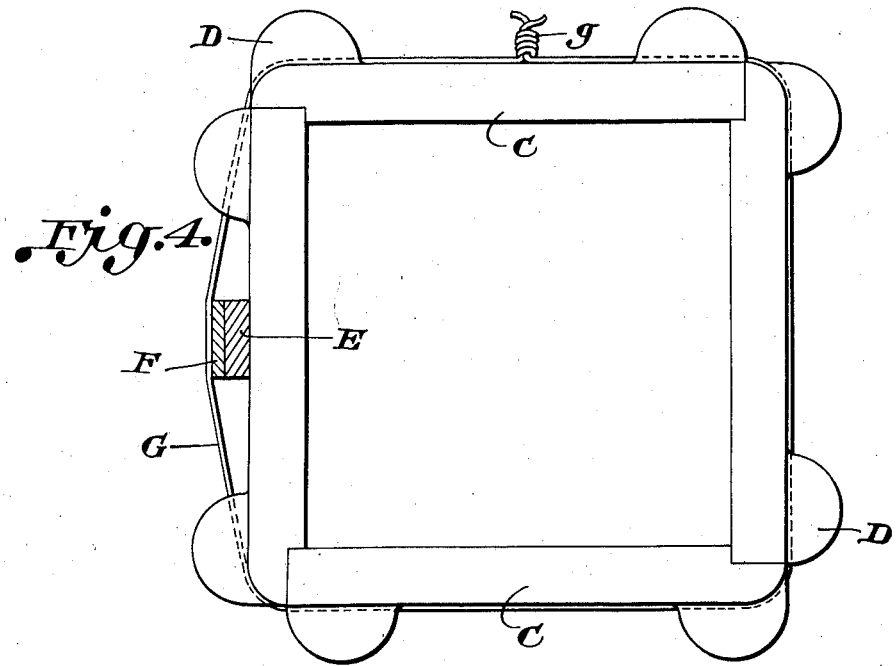
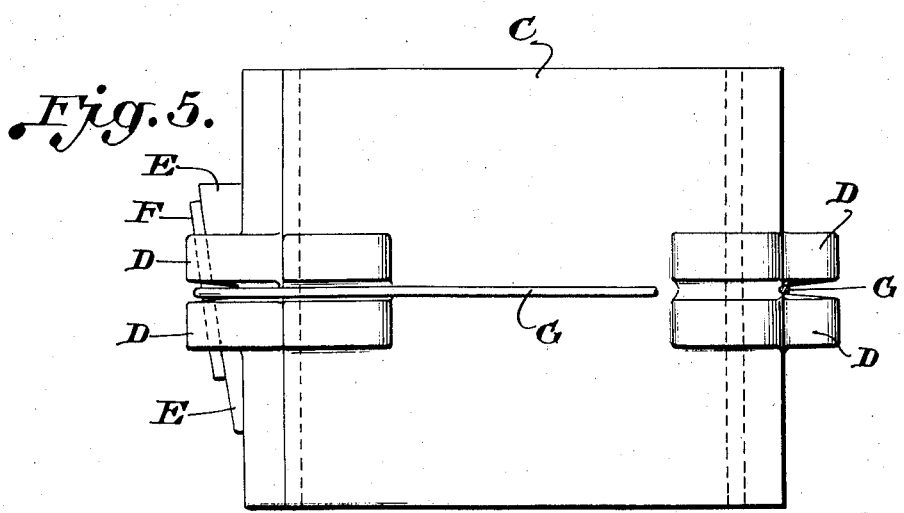

1,663,450

UNITED STATES PATENT OFFICE.

EMIL GATHMANN, OF BALTIMORE, MARYLAND, ASSIGNOR TO THE GATHMANN ENGINEERING COMPANY, OF BALTIMORE, MARYLAND, A CORPORATION OF MARYLAND.

SHRINK-HEAD CASING FOR INGOT MOLDS.

Application filed September 6, 1924. Serial No. 736,274.

This invention relates to what is known in the art of metal casings as sink heads, shrink head casing, feeders, or hot tops for ingot molds. For convenience, such devices will be herein referred to as feeders.

Feeders of this kind are shown in my U. S. Patents No. 1,117,181 of November 17, 1914; No. 1,137,264 of April 27, 1915 and No. 1,501,655 of July 15, 1924. These patents show feeders made of fire brick or similar refractory material formed in sections and adapted to enter the mold cavity. The two last named patents show the feeder sides joined at the corners and held in place by tie wires or bands. Means is provided in each case for supporting the feeder on the mold top.

According to my present invention, I have so improved the feeder that the sections or slabs composing the feeder may with greater facility be securely bound together and held against movement, either laterally or vertically either before being placed on the mold or after being so placed. The feeder sections formed in accordance with my present invention may be cheaply made, packed for transportation within a small compass and readily assembled and placed in working position.

In carrying out my invention I employ for each feeder a plurality of sections or slabs, preferably four, which are preferably of the same shape and size and are so formed that the corners of the sections interlock when assembled. Each section is formed on its outer side with one or more grooved projections adapted to receive a binding device, such as a tie wire or band. Preferably, each section is formed with two such projections, one near each end and each projection preferably comprises two lugs disposed one above the other with a groove or recess between them. These lugs serve to confine the tie wire and also to support the feeder on the top of the mold.

Other features of the invention will be hereinafter specified.

My improvements are illustrated in the accompanying drawings, in which

Figure 1 is a perspective view of an ingot mold with my improved feeder supported thereon.

Figure 2 is a sectional view of a Gathmann ingot mold provided with one of my improved feeders.

Figure 3 is a perspective view of one of the sections or slabs of which the feeder is made.

Figure 4 is a top plan view of the feeder.
Figure 5 is a side elevation thereof.

My improved feeder may be made of any desired number of sections and may be applied to molds of various kinds.

The drawings show an ingot mold M of the well known Gathmann type; in this instance a big end up mold is illustrated, which as usual is provided with a plate P disposed above a stripping plug of the usual kind.

The feeder A is shown in working position in Figure 2 and constitutes what is known in the art as a feeder, sink head, shrink head casing or hot top. The molten metal is poured through the feeder and the upper part of the ingot is cast in this feeder, the feeder thus being in fact a part of the mold for the ingot being cast.

For purposes of illustration and for simplicity, I have shown a feeder embodying my improvements made in four sections. They are cast from fire brick or similar material and preferably the four sections are of the same shape and size in order that they may be interchangeable. One of the preferred forms of sections or slabs is shown separately in Figure 3. It is of general rectangular shape, it is of the same thickness throughout, its upper and lower edges being parallel and one end $c$ is straight and unbroken, while its opposite end is recessed at $c'$ and preferably rounded as indicated.

On its outer sides the feeder section or slab is formed with projections D which are grooved at $d$. Preferably each projection comprises two lugs spaced apart with a space or groove $d$ between them. In the preferred form of the invention, there is a grooved projection or two lugs near each end of the section so that there are grooved projections at each corner of the feeder. The grooves or spaces $d$ are designed to receive a tie wire band or securing device G.

To assemble the sections, the ends $c$ of the slabs are made to engage or interlock with the recesses $c'$ of adjacent slabs and the tie wire G is passed around them in such manner as to enter the grooves $d$. When this is done the ends of the wire are twisted together or otherwise secured as indicated at $g$ in Figure 4. In this manner the sections of the feeder are securely held in place both lateral and vertical movement being prevented. In order to tighten the band or tie wire I preferably employ a wedge E which is driven between the wire and the feeder and in order to prevent the wedge from distorting the wire I use a small piece of wood F which is interposed between the wire and the wedge while the latter is being driven.

The feeder sections may be assembled and secured either before the feeder is placed on the mold or afterwards. The feeder when in use is preferably at first supported on bars B which rest on the top of the mold. After the mold is filled to the desired extent, the bars may be removed and the feeder allowed to descend into the mold. After this the pouring operation may be completed and the ingot may be cooled. Wedges may be interposed between the bars B and the lugs D to raise the feeder to a higher level if desired. After the ingot is cooled it may be removed from the mold in the usual way and the feeder as usual, will adhere and may be severed from the body of the ingot at the crop end thereof.

The inner ends of the grooves $d$ are rounded to receive the tie wire in order that it may be securely seated therein.

As heretofore, the feeder is of smaller cross section than the upper part of the mold cavity and the lower portion of the feeder projects into the cavity. The projections or lugs D are preferably placed midway between the upper and lower ends of the feeder so that the latter is made reversible.

It is to be understood that the bars B may be of any desired thickness or interchangeable bars may be used so as to hold the feeder at the desired elevation to accommodate different circumstances.

I claim as my invention:

1. As an article of manufacture, a slab of refractory material adapted to be interchangeably assembled with similar slabs to form an ingot mold feeder, one vertical end of said slab being formed of an angular contour and the opposite end being formed of a rounded contour and having its inner portion provided with a recess.

2. A feeder for ingot molds comprising a plurality of slabs of refractory material, one vertical end of each slab being formed of an angular contour and the opposite end being formed of a rounded contour and having its inner portion provided with a recess.

3. A feeder for ingot molds comprising four slabs of refractory material fitted together at the corners, one vertical end of each slab being formed of an angular contour and the opposite end being formed of a rounded contour and having its inner portion provided with a recess.

4. As an article of manufacture, a slab of refractory material, one vertical end of said slab being formed of an angular contour and the opposite end being formed of a rounded contour and having its inner portion provided with a recess, laterally-projecting lugs being located adjacent to the vertical end of each slab.

In testimony whereof, I have hereunto subscribed my name.

EMIL GATHMANN.